United States Patent [19]

Burch

[11] Patent Number: 5,160,005

[45] Date of Patent: Nov. 3, 1992

[54] PAWL AND RATCHET CLUTCH WITH TORSION SHAFT

[75] Inventor: Darrel W. Burch, Phoenix, Ariz.

[73] Assignee: Allied-Signal Inc., Morris Township, Morris County, N.J.

[21] Appl. No.: 618,780

[22] Filed: Nov. 27, 1990

[51] Int. Cl.$^5$ ............................................. F16D 11/06
[52] U.S. Cl. ...................................... 192/42; 192/46; 192/104 C
[58] Field of Search ........................ 192/42, 46, 104 C

[56] References Cited

U.S. PATENT DOCUMENTS

| | | | |
|---|---|---|---|
| 542,392 | 7/1895 | Manson | 192/46 |
| 1,532,564 | 4/1925 | Von Soden-Fraunhofen | 192/108 |
| 1,584,246 | 5/1926 | Seely | 192/46 |
| 2,224,322 | 12/1940 | Sinclair | 192/48.5 |
| 2,511,908 | 6/1950 | Forbess | 192/42 |
| 2,633,950 | 4/1953 | Phaneuf | 192/415 |
| 2,643,750 | 6/1953 | Moulton | 192/48.1 |
| 2,756,855 | 7/1956 | Kloss | 192/41 S |
| 2,869,682 | 1/1959 | Millar | 185/41 R |
| 3,070,081 | 12/1962 | Mercer et al. | 123/185.14 |
| 3,505,890 | 4/1970 | Peterson | 192/46 X |
| 3,521,505 | 7/1970 | Sebring | 475/6 |
| 3,589,486 | 6/1971 | Keich | 192/46 |
| 3,720,294 | 3/1973 | Plamper | 192/46 |
| 3,727,431 | 4/1973 | Yokel | 464/17 |
| 3,727,733 | 4/1973 | Mrazek | 192/104 C X |
| 3,782,355 | 1/1974 | Hamman | 192/42 X |
| 3,880,267 | 4/1975 | Auble et al. | 192/108 |
| 4,113,075 | 9/1978 | Walker | 192/3.31 |
| 4,914,906 | 4/1990 | Burch | 192/42 |

FOREIGN PATENT DOCUMENTS

| | | |
|---|---|---|
| 0195172 | 11/1985 | European Pat. Off. . |
| 0331982 | 2/1989 | European Pat. Off. . |
| 0434412 | 11/1989 | European Pat. Off. . |
| 1290014 | 2/1969 | Fed. Rep. of Germany . |
| 673283 | 4/1952 | United Kingdom . |

Primary Examiner—Leslie A. Braun
Assistant Examiner—Nicholas Whitelaw
Attorney, Agent, or Firm—Jerry J. Holden; James W. McFarland; Robert A. Walsh

[57] ABSTRACT

A pawl and ratchet clutch and an air turbine starter having such a clutch is provided in which a single, torsion shaft simultaneously forces each of a plurality of pawls into engagement with the ratchet. The torsion shaft is coupled to a cam having radially extending arms with involute surface portions. Each pawl has a radially extending member that has an involute surface. The pawls and cam are disposed within the clutch so their respective involute surfaces are in rolling contact with each other. The torsion shaft is coaxially disposed within the clutch so as to be readily accessible, which permits its twist to be adjusted without dismantling the starter.

10 Claims, 3 Drawing Sheets

PAWL AND RATCHET CLUTCH WITH TORSION SHAFT

TECHNICAL FIELD

The present invention relates generally to over running clutches and methods and in particular to an improved pawl and ratchet clutch in which a plurality of pawls are simultaneously spring-loaded by a single, torsional tube. Still more particularly, the present invention is directed to an air turbine starter having this improved pawl and ratchet clutch.

BACKGROUND OF THE INVENTION

Air turbine starters are well known in the aviation field and are commonly used to start gas turbine engines. A common clutch type often used in air turbine starters is the pawl and ratchet type, (see FIG. 3). This type of clutch includes a ratchet 6 which is driven by the turbine of the starter through gearbox reduction gearing. A pawl carrier 8 surrounds the ratchet 6 and has a plurality of pawls 2 mounted thereto. Each of the pawls 2 is spring-loaded into engagement with the ratchet 6 by a leaf spring 4. The torque generated by the starter's turbine is transmitted through the ratchet 6 to the pawls 2 and then to the pawl carrier 8. The pawl carrier 8 transmits this torque starter to the starter's output shaft which drives the gas turbine engine.

During a normal start sequence of a gas turbine engine, the starter and engine are initially at rest. As the turbine of the starter begins to rotate, the ratchet 6 begins to rotate, engaging the head portion of each of the pawls 2. At this point, the starter is driving the engine. As the starter and engine accelerate, centrifugal force begins to counteract the force of the leaf springs 4 which are in sliding, frictional engagement with the tails of the pawls 2. After starter cutout, the engine accelerates on its own. The pawl carrier 8, which is now driven by the engine through the output shaft of the starter, accelerates allowing the pawls 2 to completely disengage from the ratchet 6 due to the centrifugal force. The starter's turbine and the ratchet 6 then coast to rest, while the engine accelerates to engine idle speed. Centrifugal force on the pawls 2 prevent the pawls 2 from re-engaging the ratchet 6 until the engine is shut down and the engine speed is low enough for the spring force to overcome the centrifugal force.

In the case of an inflight or ground restart attempt, the starter is initially at rest and the engine is decelerating. A restart may be made if the engine speed is below the pawl return speed. The pawl return speed is the rotational speed of the engine at which the spring force overcomes the centrifugal force and the springs 4 begin to force the pawls 2 into engagement with the ratchet 6. At the pawl return speed the pawls 2 will be ratcheting over the ratchet 6 because the starter is at rest. Once started, the turbine of the starter and the ratchet 6 accelerate rapidly until the ratchet rotational speed equals the pawl rotational speed. Engagement between the pawls 2 and the ratchet 6 occurs and the starter begins to accelerate the engine. The remaining operation is identical to the normal start sequence.

Because modern aircraft engines are larger than their predecessors, they require greater assistance from the air turbine starter. To meet this requirement, the starter must drive the engine almost to its idle speed. Consequently, pawl return speeds have risen and the pawl and ratchet clutches used to start these modern engines must be able to transmit larger loads then previously required. To transmit these loads the size and mass of the pawls has been increased which in turn has required greater spring forces to force the pawls into engagement. As a result, the leaf springs in the clutch are exposed to greater stresses increasing the frictional engagement between the leaf spring and the pawls, and between the individual spring leaves. Not surprisingly, on starters used with these modern engines an increase in the spring wearout rate has been observed.

Another disadvantage associated with leaf springs, as used in the prior art clutch, is that each pawl requires a separate leaf spring. Because the pawls rotate independent from each other, during a running engagement, some of pawls may engage the ratchet earlier than other pawls resulting in a single or double pawl engagement and generating an eccentric load within the clutch.

Also, because the forces on the springs and pawls must be balanced to provide the necessary disengage/reengage speed, the manufacturing tolerances on leaf springs must be held very close, making their manufacturing expensive. For the newer and larger pawls it is very difficult to manufacture the leaf springs to provide the required spring forces.

Accordingly, a need exists for a pawl and ratchet clutch and an air turbine starter having such a clutch in which the disadvantages associated with leaf springs are eliminated.

SUMMARY OF THE INVENTION

An object of the present invention is to provide a pawl and ratchet clutch and an air turbine starter having such a clutch in which a single spring acts simultaneously on all the pawls.

Another object of the present invention is to provide a pawl and ratchet clutch and an air turbine starter having such a clutch in which the contact between the spring and the pawl is a rolling contact and not a frictional contact.

Yet another object of the present invention is to provide a pawl and ratchet clutch and an air turbine starter having such a clutch in which the spring is easily accessible after the starter has been assembled.

Yet still another object of the invention is to provide a pawl and ratchet clutch and an air turbine starter having such a clutch that can drive the aircraft engine almost to the engine's idle speed before disengaging.

The present invention achieves the above-stated objectives by providing an air turbine starter having a pawl and ratchet clutch in which a torsion shaft is coaxially amounted within the clutch output shaft. One end of the torsion shaft is held at a preset twist in the open end of the output shaft by an easily accessible taper lock. The other end of the shaft is rotatably coupled to a cam having three involute surfaces each of which comes in rolling contact with an involute surface of the pawl.

These and other objects, features, and advantages of the present invention are specifically set forth or will become apparent from the following detailed description of a preferred embodiment of the invention when read in conjunction with the accompanying drawings.

DESCRIPTION OF THE PREFERRED EMBODIMENT

Figure 1:
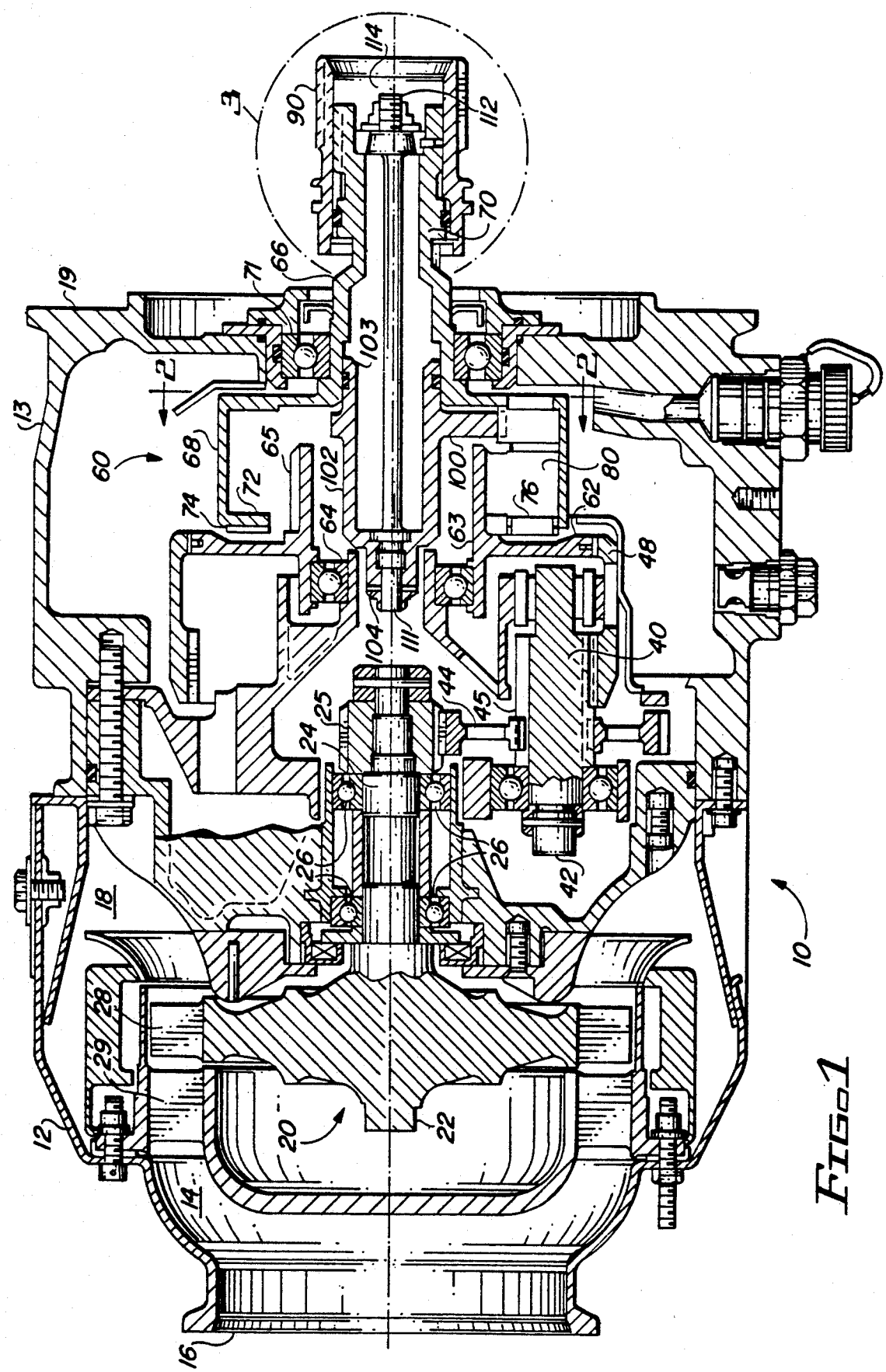
FIG. 1 presents a plan cross-sectional view of an air turbine starter embodying the present invention.

Referring to the drawings, FIG. 1 shows an air turbine starter 10 embodying the present invention. The air turbine starter 10 has a first housing assembly 12 and a second housing assembly 13. The housing assembly 12 defines a flow path 14 extending from an inlet 16 to an outlet 18. The housing assembly 13 includes a mounting flange 19 for mounting the air turbine starter to an aircraft engine (not shown).

Within the air turbine starter 10, the housing assemblies 12 and 13 support a turbine section 20, a compound planetary gear train 40 and an overrunning clutch 60 described in greater detail below.

The turbine section 20 is comprised of a turbine wheel 22 having a rotatable shaft 24 extending therefrom, journaled by bearings 26, and having a gear 25 secured thereon. A plurality of turbine blades 28 are circumferentially mounted to the turbine wheel 22 and are positioned within the flow path 14. Upstream of the blades 28 are a plurality of nozzles 29 mounted to the housing assembly 12 which provide the proper flow angle to the air flow before it enters the turbine blades 28. In operation, pressurized air entering through inlet 16 is properly aligned by the nozzles 29 and is then expanded across the blades 28 before exiting through outlet 18. The blades 28 convert the pressure energy of the air into rotary motion causing the turbine wheel 22, the shaft 26 and the gear 25 to rotate at the same speed as the blades 28.

The compound planetary gear train 40 is comprised of a plurality of shafts 42 reach having a gear 44 that meshes with the gear 25. A gear 45 engages a portion of the shaft 42, a ring gear 48 and a hub gear 62 which is the input side of the overrunning clutch 60. In operation, the gear train 40 converts the high speed, low torque output of the turbine section 20 into low speed, high torque input for the clutch 60.

The clutch 60 is preferably a pawl and ratchet type clutch. The clutch 60 has the hub gear 62 on its input side and a clutch drive shaft 70 on its output side. The hub gear 62 has a hollow cylindrical hub portion 63 which is supported on a bearing 64 and has a ratchet 65 circumferentially positioned along its external surface. Adjacent to the hub gear 62 is a hollow drive shaft assembly 66 comprising a clutch housing 68 integral with a clutch drive shaft 70, and mounted on bearing 71 for rotation. A portion of the drive shaft 70 extends beyond the housing 13 and has an air turbine starter output shaft 90 mounted thereon. The output shaft 90 can be coupled, for example, to a starter pad on the gearbox of a gas turbine engine, (not shown).

The clutch housing 68 has at one end a flange 72 that extends radially inward towards the center of the clutch 60. A pawl carrier 74, which is a flat annular plate, is coupled to the flange 72. Both the flange 72 and the carrier 74 preferably have three holes 76, only one of which is shown in FIG. 1, angularly spaced at about 120° from each other. Importantly the holes of the flange 72 and those of the carrier 74 must align. A pawl 80 is mounted for rotation in each of the holes 76, while operating to transmit torque to the clutch housing 68.

Referring to FIGS. 2, and 5-7, each of the pawls 80 consist of a cylindrical member 81 having proximate to a first end a head member 82 for engaging the ratchet 65 and a tail member 83, angularly oriented from the head member 82 and in the same plane, for providing counterbalance to the head member 82. Proximate to a second end of the cylindrical member 81 is a gear tooth 84 angularly positioned between the angular position of the head member 82 and the angular position of the tail member 83 and having a portion 84 with an involute surface 86 for making rolling contact with an involute surface 105 on a cam plate 100 described below.

Figure 2:
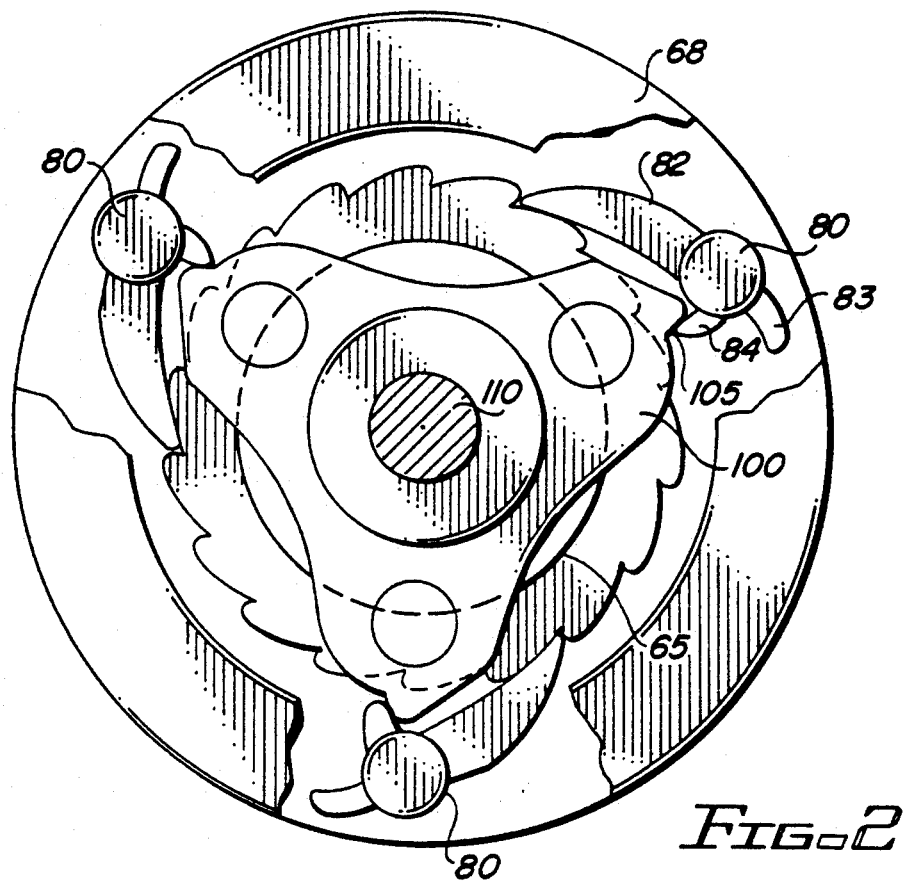
FIG. 2 is a partly cutaway, elevational cross-sectional view of the pawl and ratchet clutch of the present invention taken along line 2—2 of FIG. 1.
Figure 3:
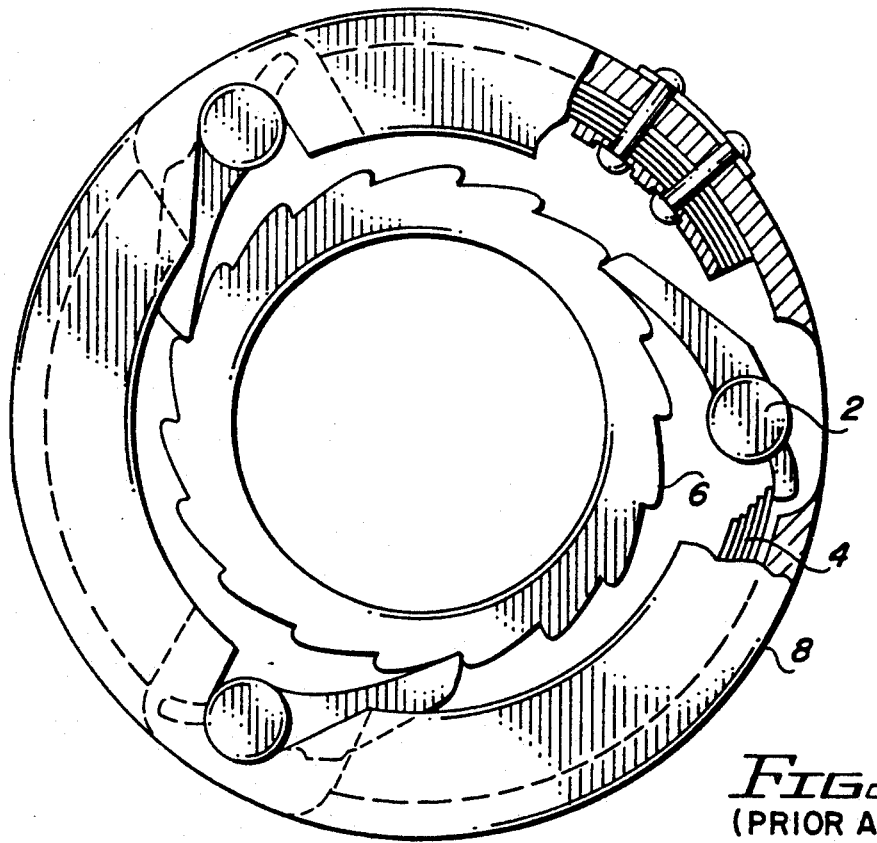
FIG. 3 is a partly cutaway, cross-sectional view of a prior art pawl and ratchet clutch.
Figure 8:
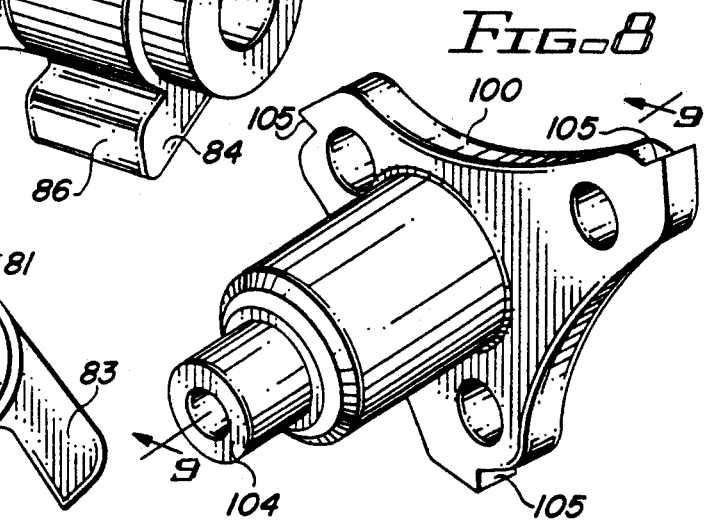
FIG. 8 is a perspective view of a cam plate 100 of the present invention.
Figure 7:
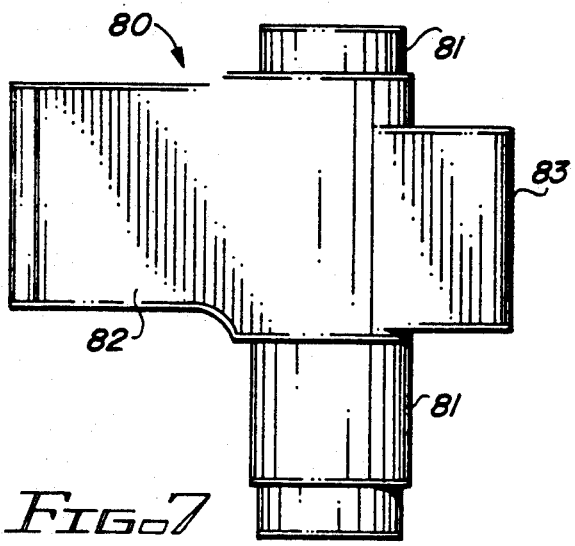
FIG. 7 is a top view of the pawl of FIG. 5.
Figure 9:
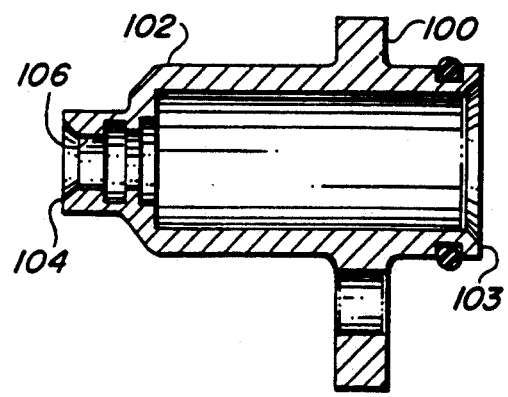
FIG. 9 is a cross-sectional view taken along line 9—9 of FIG. 8.

FIGS. 2, 8 and 9 show the cam plate 100 integrally formed with a hollow cam shaft 102. The cam plate 100 has preferably three involute surfaces 105 for making rolling contact with the involute surfaces 86. Such rolling contact produces less wear on the contacting surfaces 86, 105 than the frictional, sliding contact that occurs with the leaf springs of the prior art. The cam shaft 102 is substantially cylindrical with a first end 103 having a larger diameter than a second end 104. The first end 103 is sized to slip fit into the clutch drive shaft 70, as shown in FIG. 1. Importantly, upon assembly of the components of the clutch 60 the cam plate 100 must be positioned in relation to the clutch housing 68 so that the involute surfaces 105 come into contact with the involute surfaces 86. The second end 104 has an internal spline 106.

Figure 4:
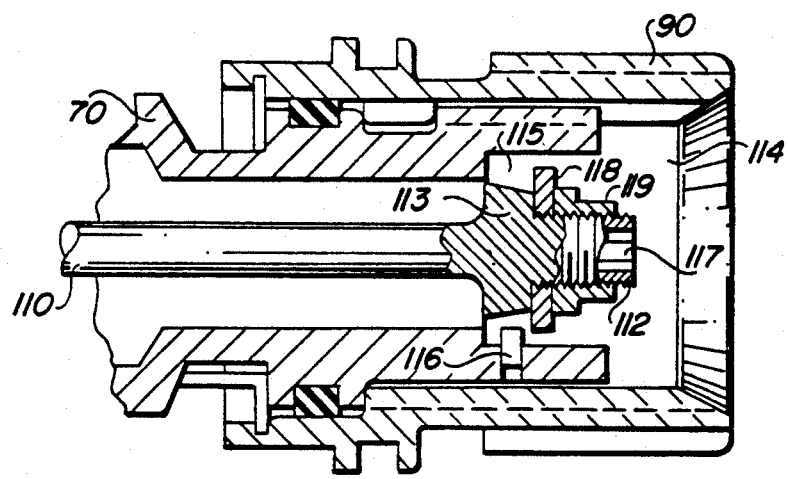
FIG. 4 is an enlarged, cross-sectional view of selected portion, encircled by line 3, of the air turbine starter shown in FIG. 1.
Figure 5:
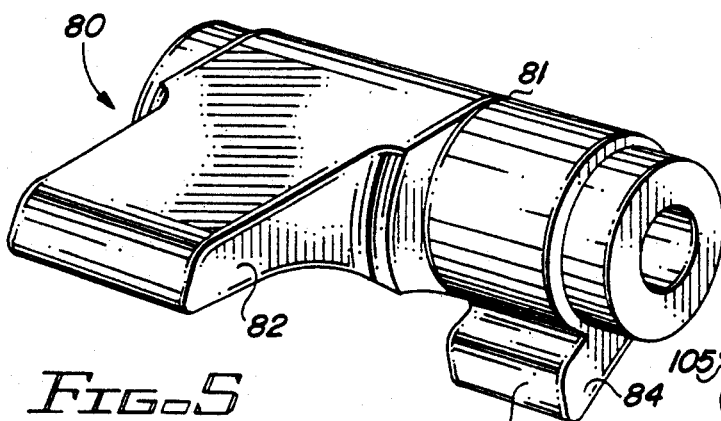
FIG. 5 is a perspective view of a pawl 80 of the present invention.
Figure 6:
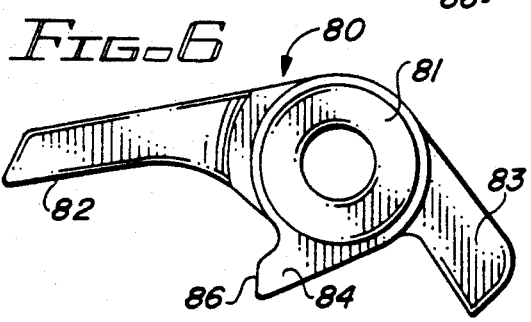
FIG. 6 is an end view of the pawl of FIG. 5.

Mounted within the cam shaft 102 and the clutch drive shaft 70 is an elongated, torsion shaft 110 made from a spring material. The torsion shaft has an inner end 111 and an outer end 112. The inner end 111 has a spline portion for torque transmitting engagement to the internal spline of the cam shaft 102. These two splines are attached together by a nut. The outer end 112 is disposed within an exit recess 114 of both the clutch shaft 70 and the output shaft 90 and is accessible when the air turbine starter 10 is not mounted to the aircraft engine, (see FIG. 4). The outer end 112 has a tapered portion 113 which contacts a bushing 115 having a direction of taper opposite the direction of taper of the portion 113. The bushing is releasably locked to the outer end 112 by a spring loaded pin 116 mounted in a hole on the inside of the clutch shaft 70. A washer 118 and a nut 119 hold the bushing in place. This taper lock arrangement allows the user quick and easy access to the torsion shaft 110. The outer end 112 also has a hex slot 117.

A method for setting and readjusting the spring force that forces the pawls of a pawl and ratchet clutch int engagement with the ratchet is also disclosed. During the assembly of the clutch 60, the torsion shaft 110 is coupled to the cam shaft 102 and tightened with a nut, so that its outer end 112 is disposed in the recess 114. An appropriate tool, not shown, is inserted in the hex slot 117 and then rotated, thereby twisting the torsion shaft 110 until the desired spring force is reached. The twisted shaft 110 is then locked into position by the taper lock arrangement previously described. If at any later time the spring force needs to be adjusted this is easily accomplished by unlocking the taper lock arrangement and adjusting the twist of the torsion shaft.

The advantages of the clutch 60 and method therefore become apparent after examining how the clutch 60 operates during a start and restart sequence.

During a normal start sequence all three pawls 80 are initially positioned to engage the ratchet 65, (see FIG. 2). As the turbine wheel 22 accelerates, the shaft 24 drives the gear train 40 which in turn drives the hub gear 62 causing the ratchet 65 to rotate. The ratchet 65 then drives the pawls 80 which in turn drive the clutch housing 68 and the drive shaft assembly 66. As the centrifugal force on the pawls 80 increases, the pawls 80 simultaneously rotate clockwise, as viewed in FIG. 2. Due to the low friction, rolling contact between the involute surfaces 84 and the involute surfaces 105, the cam plate 100 is forced to rotate counterclockwise twisting the torsion bar 110 counterclockwise, which is equivalent to compressing a spring. When the centrifugal force ceases, the torsion bar turns clockwise, due to its spring like characteristics, returning to its original degree of twist. This forces the cam plate 100 to move clockwise which simultaneously forces all three pawls 80 to rotate counterclockwise until they once again engage the ratchet 65. This simultaneous rotation of the pawls 80 prevents single or double pawl engagements and the ensuing eccentric load.

During an inflight or ground restart, the pawls 80 are initially disengaged from the ratchet 65, by the centrifugal force and fully rotated in the clockwise direction as, viewed in FIG. 2. Likewise, the cam plate 100 is fully rotated in the counterclockwise direction and the torsion shaft 110 is stressed. As the engine decelerates, the centrifugal force on the pawls 80 lessens and the torsion shaft 110 rotates clockwise forcing the pawls 80 to rotate counterclockwise until they engage the ratchet 65. A start of the turbine 20 is initiated and the remaining operation is identical to what was described in the preceding paragraph.

Thus, the present invention provides an improved pawl and ratchet clutch and an air turbine starter having such a clutch in which a single, torsion shaft simultaneously forces each of the pawls into engagement with the ratchet. Furthermore, the torsion shaft is mounted within the clutch and air turbine starter so as to be easily adjustable after the starter has been assembled.

Various modifications and alterations to the above described apparatus will be apparent to those skilled in the art. Accordingly, the foregoing detailed description of the preferred embodiment of the invention should be considered exemplary in nature and not as limiting to the scope and spirit of the invention as set forth in the following claims.

What is claimed is:

1. A pawl and ratchet clutch operably disposed between a driving member and a driven member comprising:
   an input member, having a ratchet, secured to said driving member for rotation therewith;
   a hollow output member secured to said driven member for rotation therewith;
   a torsion shaft mounted within said output member, said torsion shaft having a first end secured to a plate member having a plurality of radially extending arms; and
   a plurality of pawls mounted within said output member so as to be responsive to a centrifugal force resulting from rotation of the output member to tend toward disengagement from said ratchet, and also mounted within said output member so that each pawl of said plurality is urged into engagement with said ratchet by contact with at least one of said arms.

2. The pawl and ratchet clutch of claim 1 wherein each of said arms has an end portion with a rounded surface adjacent the point of said contact.

3. The pawl and ratchet clutch of claim 2 wherein a second end of said torsion shaft is disposed in a recess of said output member so that said second end is easily accessible when said output member is disconnected from said driven member.

4. The pawl and ratchet clutch of claim 2 wherein said plate member is a cam.

5. The pawl and ratchet clutch of claim 3 wherein said torsion shaft is secured in said recess by a locking member.

6. The pawl and ratchet clutch of claim 1 wherein each pawl of said plurality of pawls comprises a substantially cylindrical body having proximate to a first end a head portion extending radially therefrom for engaging said ratchet and a tail portion, in an opposed orientation to said head portion, for counterbalancing said head portion, said body having proximate to a second end a member extending radially therefrom, said member having a rounded end surface portion adjacent the point of said contact.

7. The pawl and ratchet clutch of claim 6 wherein said member having said rounded end surface portion is angularly disposed intermediate said head and tail portions.

8. A pawl for use in a pawl and ratchet clutch, comprising:
   a cylindrical member rotatable about an axis having a first and second end axially spaced from each other;
   a head portion proximate to said first end and extending radially from said first end;
   a tail portion proximate to said first end and extending radially from a said first end, said tail portion being in an opposed orientation to said head portion; and
   means, proximate to said second end and extending radially from said second end, for receiving a spring force that causes said pawl to rotate.

9. The pawl of claim 8 wherein said receiving means is angularly disposed intermediate said head and tail portions.

10. The pawl of claim 9 wherein said receiving means is a gear tooth.

* * * * *